2,957,873
ARALKYLHYDRAZINIUM SALTS

Bernard Rudner, Pittsburgh, Pa., assignor to W. R. Grace & Co., New York, N.Y., a corporation of Connecticut No Drawing. Filed Aug. 4, 1958, Ser. No. 753,156

13 Claims. (Cl. 260—247.5)

This invention relates to organic compounds which contain a quaternized nitrogen as part of their structure. In one specific aspect, it relates to aromatic substituted hydrazinium salts which may be named aralkylhydrazinium salts.

It is an object of the present invention to provide a new class of hydrazinium salts, useful for pharmaceutical and other purposes, which can be made in commercial quantities.

In accordance with the present invention, there has been discovered a new and useful generic class of hydrazinium compounds corresponding to the general formula:

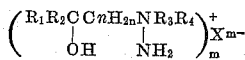

In the above formula, $R_1$ is a univalent radical selected from the group consisting of phenyl, lower alkyl phenyl, halophenyl, lower alkoxy phenyl, benzyl and other aromatic or pseudoaromatic carbocyclic or heterocyclic radicals. $R_2$ may be phenyl, lower alkyl phenyl, halophenyl, lower alkoxy phenyl, cycloalkyl, lower alkyl or hydrogen. $R_3$ and $R_4$ taken individually are lower alkyl but when taken together with the nitrogen on which they are both substituents form a cyclic compound selected from the group consisting of piperidine, morpholine, piperazine and pyrrolidine. The subscript $n$ represents a whole number less than four making $CnH_{2n}$ a divalent alkylene radical. X is an anion bearing the charge $m$; $m$ also indicates the number of univalent cations required to balance the charge on X.

When my compounds are used for pharmaceutical purposes X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydrantoin, carbonate, cacodylate, aconitate, sulfamate, gentisate, malate and the like.

One method of preparing the novel compounds of my invention is to react chloramine with the teritary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al. U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230, filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Other methods of preparing the novel compounds of my invention include the well-known alkylation of 1,1-disubstituted hydrazines

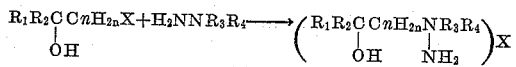

the novel reaction of alkylene oxides with 1,1-disubstituted hydrazinium salts

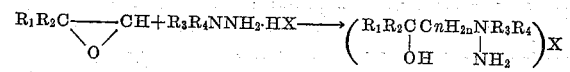

disclosed in the co-pending application Serial No. 665,605, filed June 13, 1957, and the reaction of hydroxylamine-o-sulfonic acid with tertiary amines. This latter method produced the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium componds of my invention are capable of being prepared directly. In order to provide the other useful aralkylhydrazinium salts of the present invention, it is necessary to prepare the compounds containing other anions by mettothesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

In general, the novel compounds of my invention exhibit remarkable and unexpected pharmacological properties. Because of the low therapeutic doses required to effect desirable changes as compared with the high doses required for toxic effects to result, these compounds have a large range of pharmacological utility. In particular these compounds exhibit the remarkable and unexpected tendency, when administered in small doses, of lowering the blood pressure without affecting the respiratory process. Further, this hypotensive effect is apparently due, among other things, to the presence of a hydroxy group on the carbon atom which bears an aromatic substituent and which is attached by an alkylene group to the appropriately substituted hydrazinium nitrogen atom.

The scope and utility of my invention is further illustrated by the following examples:

*Example I*

Ten grams of artane hydrochloride, 3-(1-piperidyl)-1-cyclohexyl-1-phenyl-1-propanol hydrochloride, was dissolved in 200 ml. of water containing excess sodium carbonate. The free base was extracted with 250 ml. of chloroform and the dried solution treated with gaseous chloramine. After removal of the resultant ammonium chloride by filtration, the reaction mixture was evaporated to yield 10.9 g. of crude product. The residue was purified by solution in hot methyl alcohol, filtration and addition to excess cold ethyl acetate. A repetition of the purification gave an 89% yield of pure 1-amino-1-(3-phenyl-3-cyclohexyl-3-hydroxypropyl)piperidinium chloride, a colorless hygroscopic solid melting 227–228° C. Upon analysis, the composition of the product compared with theory as follows: percent C calculated 68.1, found 68.8; percent H calculated 9.42, found 9.24; and percent N calculated 7.93, found 7.99. Treatment of small portions of the product with saturated solutions of picric acid and potassium hexafluophosphate gave the corresponding piperidinium picrate (M.P. ca. 267° C.) and hexafluophosphate (M.P. 173°) respectively.

*Example II*

A dry (solvent free) mixture of 1.75 g. of methylstyrene oxide and 1.4 g. of dimethylhydrazine hydrobromide was heated with stirring at 95–100° C. for 4 hours. The cooled reaction mixture was washed well with ether, dissolved in water, made alkaline to phenolphthalein with sodium carbonate and extracted with ether. The aqueous layer was evaporated to dryness, dissolved in isopropyl alcohol and poured into excess benzene. The resultant solid was collected by filtration, dissolved in chloroform, the solution added to dioxane and the solid collected by filtration. Recrystallization from ethyl acetate-isopropyl alcohol gave pure 1,1-dimethyl-1-(2-hydroxy-2-phenylpropyl)hydrazinium bromide as a white crystalline solid melting 136–138° C. It formed a picrate melting 141–143° C.

*Example III*

About 100 mg. of the product of Example II, 100 mg. of d-10-camphorsulfonic acid and 20 mg. of sodium carbonate were boiled together in 30 ml. of 95% ethyl alcohol. The hot reaction mixture was filtered and on cooling there crystallized optically active 1,1-dimethyl-1-(2-hydroxy-2-phenylpropyl)-hydrazinium d-10-camphorsulfonate melting 171–172° C. in with decomposition.

*Example IV*

Ten grams of nethamine hydrochloride, 2-methylethylamino-1-phenyl-1-propanol hydrochloride, was converted to the free base, extracted with chloroform and treated with chloramine as in Example I. Filtration of the reaction mixture gave 5.4 g. of product contaminated with ammonium chloride; evaporation of the filtrate gave 4.0 g. additional product. The combined crude products were continuously extracted with dry chloroform in a Soxhlet apparatus. The 5.1 g. of product obtained was recrystalized from methyl alcohol-ethyl acetate to give 4.0 g. of racemic 1-ethyl-1-methyl-1-(1-α-hydroxybenzylethyl)-hydrazinium chloride. On analysis the product melting 162–164° C. analyzed as follows: percent C, 58.4; percent H, 8.37; percent N, 11.5; and percent Cl, 14.9. Calculated for $C_{12}H_{21}N_2OCl$: percent C, 58.9; percent H, 8.65; percent N, 11.5; and percent Cl, 14.5.

*Example V*

A portion of the product of the previous example and an equivalent amount of sodium diethylbarbiturate were fluxed together in ethyl alcohol for 20 minutes. The reaction mixture was filtered hot to separate the resultant sodium chloride, allowed to cool and poured into excess ethyl acetate. Filtration followed by washing with chloroform gave pure 1-ethyl-1-methyl-1(1-α-hydroxybenzylethyl)hydrazinium diethylbarbiturate as a white crystalline solid melting 181–182° C.

*Example VI*

N-aminomorpholine hydrochloride (1.4 g.) and benzylethylene oxide (1.8 g.) were heated together with stirring for 4 hours at 95–100° C. After cooling, the reaction mixture was triturated with 50 ml. of 5% aqueous sodium carbonate and extracted three times with 50 ml. portions of ether. The residue obtained on evaporation of the aqueous layer was worked up in a manner similar to the product of Example II to yield ca. 80 mg. of a hygroscopic thick yellow oil of pure 4-amino-4-(2-hydroxy - 3 - phenylpropyl)morpholinium chloride. When portions of the product were treated with potassium hexafluophosphate and picric acid, the corresponding hexafluophosphate (oil) and picrate (M.P. 128–129° C.) were obtained.

*Example VII*

Thirty-five grams of procyclidine hydrochloride, N-(3-cyclohexyl - 3 - phenyl - 3 - hydroxy-1-propyl)pyrrolidine hydrochloride, was converted to the free base, extracted with chloroform and treated with chloramine as in Example I. After removal of ammonium chloride by filtration, the filtrate was evaporated to yield 28.6 g. of crude product. On recrystallization of the residue from isopropyl alcohol there resulted 22.4 g. of colorless needles of 1 - amino-1-(3-phenyl-3-hydroxy-3-cyclohexylpropyl)-pyrrolidinium chloride melting at 201–202° C. The pure product analyzed: percent C=67.0, percent H=9.00 and percent N=7.99. Calculated for $C_{19}H_{31}N_2OCl$: percent C =67.5, percent H= 8.95 and percent N=8.29. Portions of the product were converted to the fluorophosphate (M.P. 170–171° C.) and picrate (M.P. 68–72° C.).

Example VIII

Starting with 1-amino-(3-phenyl - 3 - hydroxy-3-cyclohexylpropyl)-pyrrolidinium chloride (the product of Example VII) the corresponding iodide and sulfate were prepared as outlined below: Shaking the chloride with a saturated aqueous solution of potassium iodide and recovery of the precipitate by filtration gave the pyrrolidinium iodide as a solid melting 187–190° C. with decomposition. When a portion of the chloride was shaken with silver sulfate, a precipitate of silver chloride resulted; the neutral pyrrolidinium sulfate (melting ca. 217° C. with decomposition) was isolated from the filtrate.

Example IX

Sodium o-acetoxybenzoate and 1-amino-(3-phenyl-3-hydroxy-3-cyclohexylpropyl)pyrrolidinium chloride were heated together in alcoholic solution. After the reaction mixture had been filtered from the resultant sodium chloride, the filtrate was chilled to give crystals of the pyrrolidinium o-acetoxybenzoate melting 156–158° C.

Example X

A solution of 1.5 g. of 1,1-diphenyl-3-dimethylamino-1-propanol in 25 ml. of methyl alcohol containing 0.5 g. of sodium methoxide was mixed with a suspension of 1.5 g. of hydroxylamine-o-sulfonic acid also in 25 ml. of methyl alcohol. After the initial heat of reaction had subsided, the reaction mixture was refluxed for 20 minutes and cooled. The off-white precipitate that resulted on standing in the cold overnight was collected by filtration and dissolved in water. The aqueous solution was made alkaline to phenolphthalein with sodium carbonate and extracted three times with 30 ml. portions of xylene. The residue obtained on evaporating the aqueous layer in vacuo was taken up in boiling methyl alcohol and on cooling the solution there resulted crystals of 1,1-dimethyl-1-(3,3-diphenyl-3-hydroxypropyl)hydrazinium sulfate. After collection by filtration and drying the product, a neutral sulfate, melted and decomposed about 233° C.

Example XI 1-amino-1-(3-phenyl-3-hydroxy-3-cyclohexylpropyl)pyrrolidinium chloride had an $LD_{50}$ of 175 mg. per kg. in mice. A solution was prepared in physiological saline at a concentration of 20 mg./ml. A female dog weighing 8.5 kg. received intravenous doses of 0.5, 1.0, 5.0, 10 and 20 mg./kg. over a period of approximately five and one-half hours. The administration of doses of 0.5 to 5.0 mg./kg. caused moderate but transient falls in blood pressure with little or no effect on respiration. Both doses of 10 mg./kg. caused marked falls in blood pressure lasting 45 to 60 minutes with little or no effect on respiration. The 20 mg./kg. dose produced immediate apnea, a fall in blood pressure to 0 mm. Hg and death with apnea occurring before the heart stopped. Blood pressure responses to epinephrine and nor-epinephrine were not significantly affected during the study. The depressor response to acetylcholine was markedly antagonized following the 5.0 mg./kg. dose and completely abolished after the 10 mg./kg. dose. The pressor response to nicotine appeared to be markedly antagonized after the 1.0 mg./kg. dose and completely abolished after the 5.0 mg./kg. dose. The carotid sinus pressor reflux could not be induced after the pressor response to nicotine had been abolished. The depressor response to histamine was slightly prolonged following the 5.0 and 10 mg./kg. dose.

Example XII 1-amino-1-(3-phenyl-3-cyclohexyl-3 - hydroxypropyl)piperidinium chloride had an $LD_{50}$ of 50–75 mg./kg. in mice. A solution was prepared in physiological saline at concentrations of 0.01, 1.0 and 100 mg./ml. A male dog, weighing 11.2 kg., received intravenous doses of 0.001, 0.010, 0.05, 5.0 and 10.0 mg./kg. over a period of approximately four and one-half hours. A marked and persistent fall in blood pressure was observed following the dose of 5.0 mg./kg. The blood pressure had not returned to preinjection levels after one hour. An additional dose of 10 mg./kg. at this time caused respiratory failure and a fall in blood pressure to 0 mm. of Hg and death. There was no effect on blood pressure at doses of 0.05 mg./kg. and below; respiration was not affected at doses below 10 mg./kg. The depressor response to acetylcholine was moderately antagonized following a dosage of 0.05 mg./kg. and completely abolished after the 5.0 mg./kg. dose. There was no significant effect on the responses to epinephrine, nor-epinephrine or histamine during the study but with one exception: after the 5.0 mg./kg. dose, the pressor responses to both epinephrine and nor-epinephrine were potentiated. Furthermore, the response to the ganglionic stimulant action of both acetylcholine and nicotine was abolished.

I claim:
1. 1-amino-1-(3-phenyl-3 - cyclohexyl - 3 - hydroxypropyl)piperidinium chloride.
2. 1,1-dimethyl-1-(2-hydroxy - 2 - phenylpropyl)hydrazinium bromide.
3. 1-ethyl-1-methyl-1-(1-α - hydroxybenzylethyl)hydrazinium diethylbarbiturate.
4. 4-amino-4-(2-hydroxy - 3 - phenylpropyl)morpholinium chloride.
5. 1-amino-1-(3-phenyl-3 - hydroxy - 3 - cyclohexylpropyl)pyrrolidinium o-acetoxybenzoate.
6. 1,1-dimethyl-1-(3,3-diphenyl-3 - hydroxypropyl)hydrazinium sulfate.
7. Compounds having the formula:

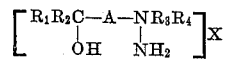

wherein $R_1$ is a member selected from the group consisting of phenyl, lower alkyl phenyl, halophenyl, lower alkoxy phenyl and benzyl; $R_2$ is a member selected from the group consisting of phenyl, lower alkyl phenyl, halophenyl, lower alkoxy phenyl, cyclohexyl, lower alkyl and hydrogen; $R_3$ and $R_4$ taken individually are lower alkyl; $R_3$ and $R_4$ taken together with the nitrogen on which they are both substituents form a cyclic compound selected from the group consisting of piperidine, morpholine, piperazine and pyrrolidine; A is an alkylene radical containing one to four carbon atoms; and X is a pharmaceutically acceptable anion.

8. Compounds according to claim 7 wherein $R_1$ is phenyl, $R_2$ is cyclohexyl, $R_3$ and $R_4$ taken together with the nitrogen on which they are both substituents form the piperidine ring and X is chloride.

9. Compounds according to claim 7 wherein $R_1$ is phenyl, $R_2$, $R_3$ and $R_4$ are lower alkyl and X is chloride.

10. Compounds according to claim 7 wherein $R_1$ is phenyl, $R_2$ is hydrogen, $R_3$ and $R_4$ are lower alkyl and X is chloride.

11. Compounds according to claim 7 wherein $R_1$ is benzyl, $R_2$ is hydrogen, $R_3$ and $R_4$ taken together with the nitrogen on which they are both substituents form the morpholine ring and X is chloride.

12. Compounds according to claim 7 wherein $R_1$ is phenyl, $R_2$ is cyclohexyl, $R_3$ and $R_4$ taken together with the nitrogen on which they are both substituents form the pyrrolidine ring and X is chloride.

13. Compounds according to claim 7 wherein $R_1$ and $R_2$ are phenyl, $R_3$ and $R_4$ are lower alkyl and X is chloride.

No references cited.